US012335116B2

(12) United States Patent
Kanza et al.

(10) Patent No.: US 12,335,116 B2
(45) Date of Patent: Jun. 17, 2025

(54) SYSTEM AND METHOD FOR DETECTING ANOMALOUS CHANGES IN DATA STREAMS AND GENERATING TEXTUAL EXPLANATIONS

(71) Applicant: AT&T Intellectual Property I, L.P., Atlanta, GA (US)

(72) Inventors: Yaron Kanza, Fair Lawn, NJ (US); Rajat Malik, Metuchen, NJ (US); Divesh Srivastava, Summit, NJ (US); Caroline Stone, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/479,952

(22) Filed: Oct. 3, 2023

(65) Prior Publication Data

US 2025/0112841 A1 Apr. 3, 2025

(51) Int. Cl.
*G06F 15/173* (2006.01)
*H04L 43/04* (2022.01)
*H04L 43/067* (2022.01)
*H04L 43/16* (2022.01)

(52) U.S. Cl.
CPC .......... *H04L 43/04* (2013.01); *H04L 43/067* (2013.01); *H04L 43/16* (2013.01)

(58) Field of Classification Search
CPC ........ H04L 43/04; H04L 43/067; H04L 43/16
USPC .......................................................... 709/224
See application file for complete search history.

(56) References Cited

U.S. PATENT DOCUMENTS

| | | | |
|---|---|---|---|
| 8,805,094 B2 * | 8/2014 | Prasad | G06F 18/2178 382/294 |
| 9,948,532 B2 * | 4/2018 | Maki | H04L 43/067 |
| 10,432,539 B2 * | 10/2019 | Wasay | H04L 43/0888 |
| 10,706,028 B2 * | 7/2020 | Baradaran | H04L 43/022 |
| 11,057,410 B1 * | 7/2021 | Myers | H04L 43/065 |
| 11,295,241 B1 * | 4/2022 | Badawy | G06N 5/022 |
| 11,330,004 B1 * | 5/2022 | Hermoni | H04L 63/1416 |

(Continued)

OTHER PUBLICATIONS

Kifer, Daniel , et al., "Detecting Change in Data Streams", Proceedings of the 30th VLDB Conference, Toronto, Canada, 2004, 2004, 12 Pages.

*Primary Examiner* — Alicia Baturay
(74) *Attorney, Agent, or Firm* — Guntin & Gust, PLC; Douglas Schnabel

(57) ABSTRACT

Aspects of the subject disclosure may include, for example, a device having a processing system including a processor; and a memory that stores executable instructions that, when executed by the processing system, facilitate performance of operations of: receiving a series of values from a data stream generated by one or more equipment in a communications network; creating a first window of values received before a first point in time and a second window of values received on or after the first point in time; comparing a distribution of values in the first window and values in the second window to compute a distance at the first point in time; repeating the creating and comparing at subsequent points in time after the first point in time, thereby generating a series of distances; computing a z-score for a first distance in the series of distances; generating an alert responsive to the z-score exceeding a threshold; and storing the alert in a log of alerts. Other embodiments are disclosed.

20 Claims, 11 Drawing Sheets

(56) References Cited

U.S. PATENT DOCUMENTS

| | | | | |
|---|---|---|---|---|
| 11,379,443 B2* | 7/2022 | Baradaran | ............ | H04L 43/022 |
| 11,836,163 B1* | 12/2023 | Iyer | ............ | G06F 16/2365 |
| 11,886,467 B2* | 1/2024 | Balabine | ............ | G06F 16/285 |
| 11,921,820 B2* | 3/2024 | Khanna | ............ | G06N 5/01 |
| 11,929,869 B2* | 3/2024 | Gonigberg | ............ | G06F 9/4411 |
| 12,056,586 B2* | 8/2024 | Lopatecki | ............ | G06N 20/00 |
| 2010/0056173 A1* | 3/2010 | Bloom | ............ | H04L 67/52 |
| | | | | 455/456.1 |

* cited by examiner

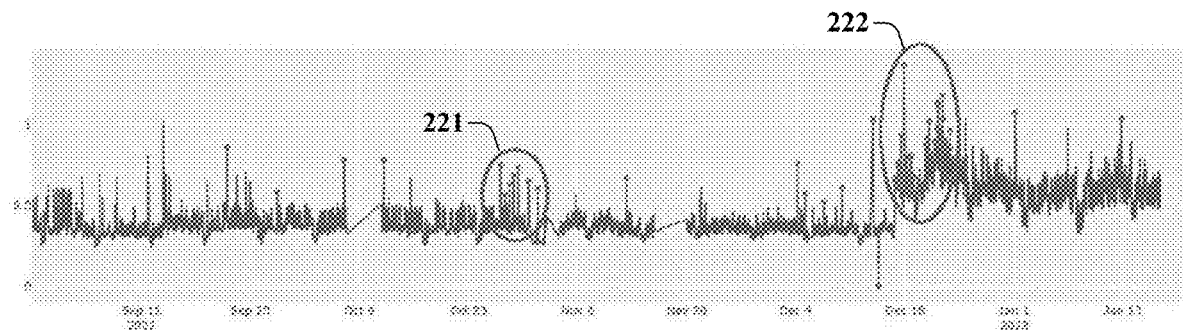
220
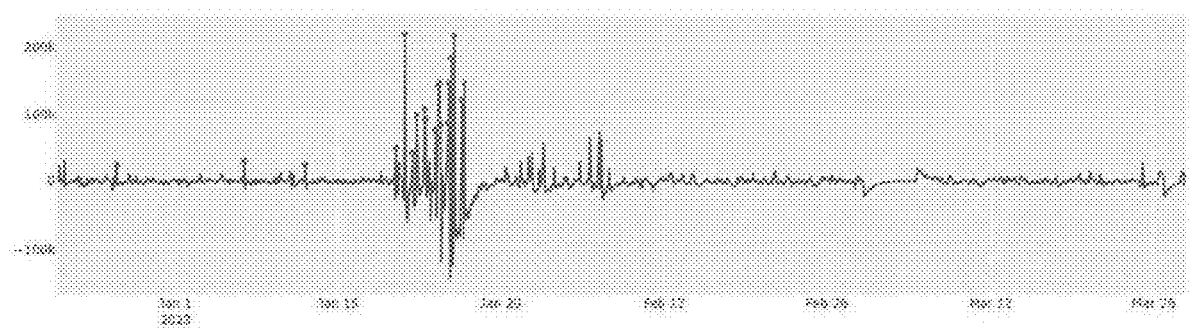
223
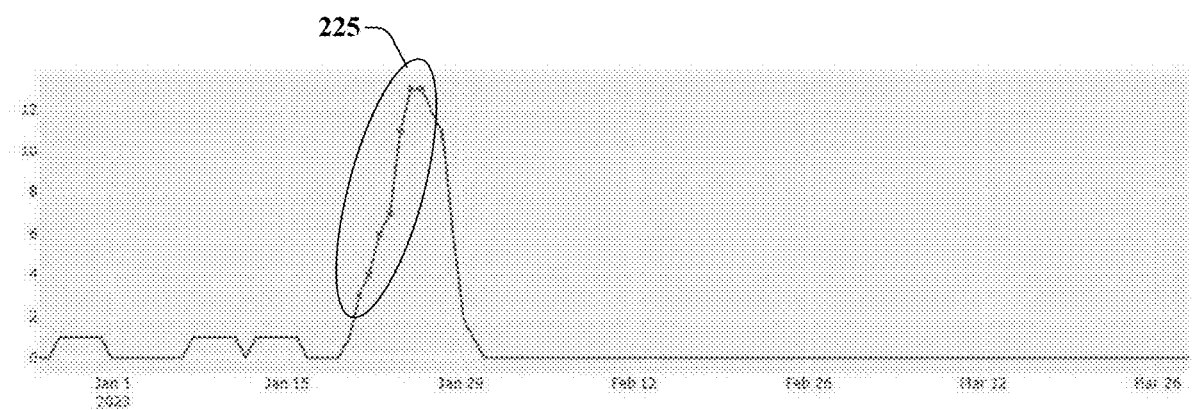
224
FIG. 2C

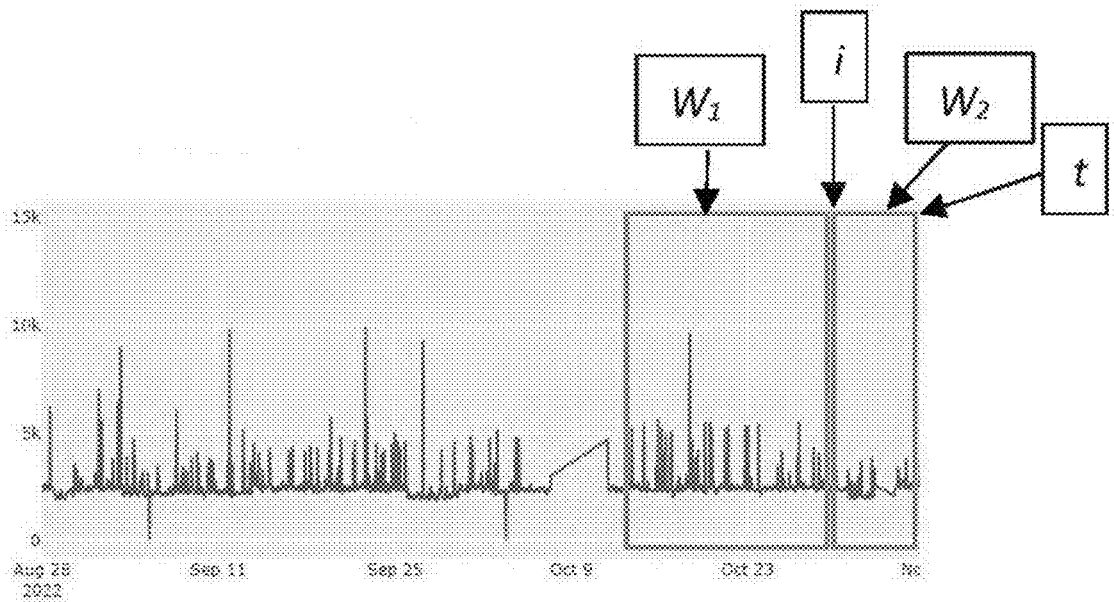
226
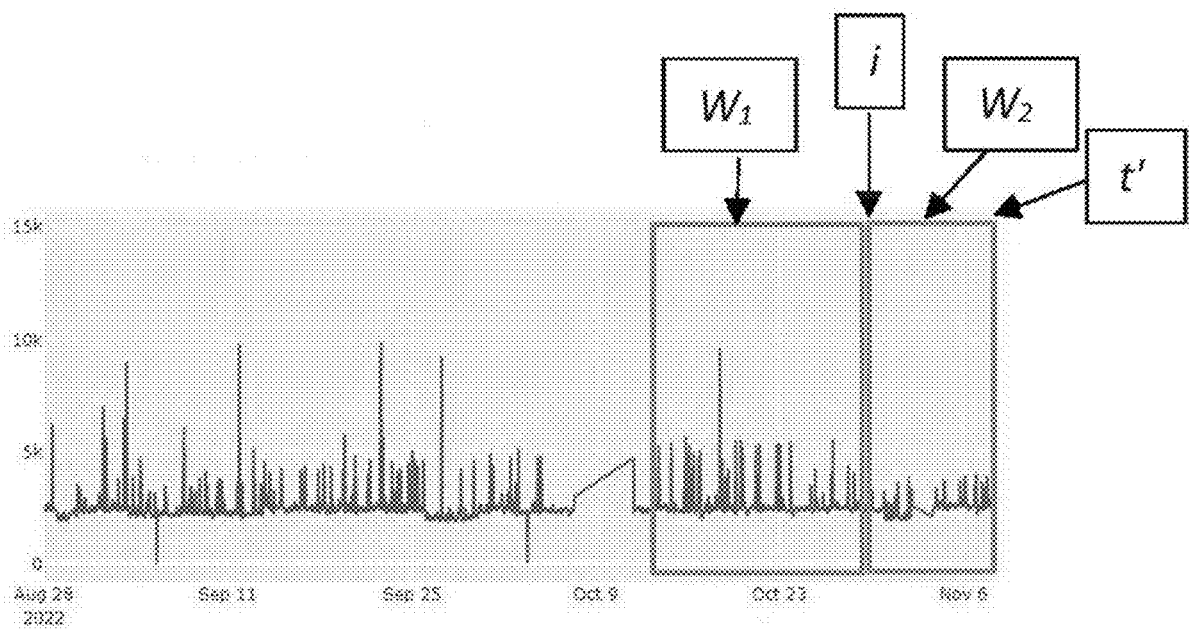
227
FIG. 2D

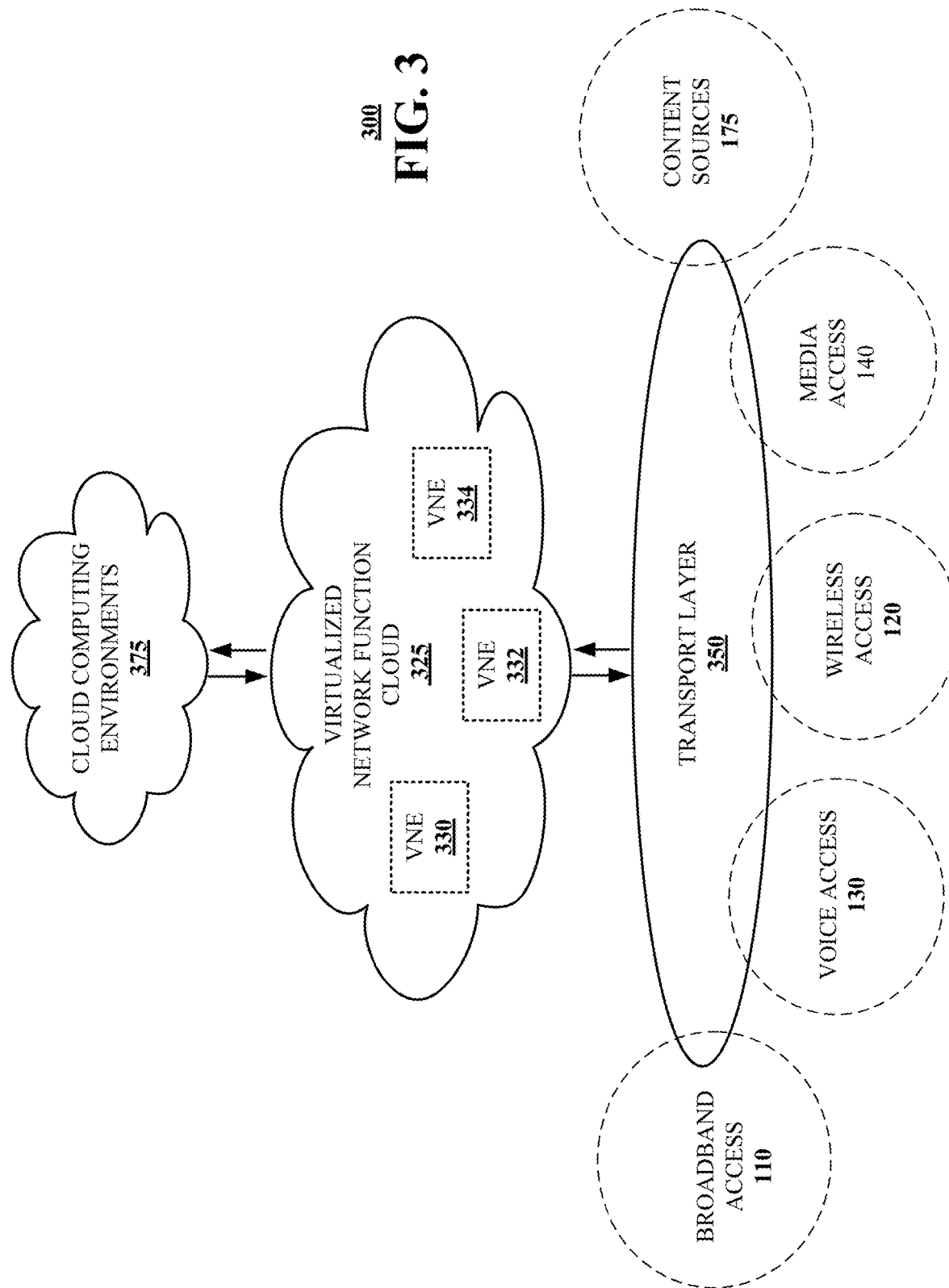

SYSTEM AND METHOD FOR DETECTING ANOMALOUS CHANGES IN DATA STREAMS AND GENERATING TEXTUAL EXPLANATIONS

FIELD OF THE DISCLOSURE

The subject disclosure relates to a system and method for detecting anomalous changes and data quality issues in data streams and generating textual explanations.

BACKGROUND

When monitoring complex systems like computer networks, cellular networks, data centers, cloud infrastructures and content delivery networks, the monitoring system generates a data stream of measurements. Such measurements may include processing times, data transfer times, communication latency, the volume of the transferred data, CPU utilization, memory usage, network throughput, etc. The data stream of measurements can help track the health of the monitored system. The goal of monitoring is to guarantee the liveliness and effectiveness of the monitored system. Such monitoring is crucial when critical applications depend on the monitored system. Hence, monitoring is an essential component of systems that continuously examine the state of the network and of critical machines.

Monitoring is also used for detecting security attacks, frauds, outages, and the effect of natural events like storms on the infrastructure of a company and its services. There are many tools and methods for detecting anomalies (outliers) in streaming data. Anomalies are values in the data stream that are significantly different from the values that are expected based on previous observations. Often, anomalies can indicate that the system does not function properly. However, most anomalies are ephemeral and can be ignored because by the time that they are being noticed the system is already back to normal. Raising too many alerts on insignificant anomalies can lead to alert fatigue, where operators ignore alerts altogether or cannot distinguish between severe alerts and reports on minor glitches. For instance, many data quality issues can lead to raising more alerts than necessary.

BRIEF DESCRIPTION OF THE DRAWINGS

Reference will now be made to the accompanying drawings, which are not necessarily drawn to scale, and wherein:

FIG. 2C is a diagram illustrating an example, non-limiting embodiment of graphs of data streams and data analysis performed by a system functioning within the communication network of FIG. 1 in accordance with various aspects described herein.

FIG. 2D is a diagram illustrating an example, non-limiting embodiment of graphs of data streams and data analysis performed by a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
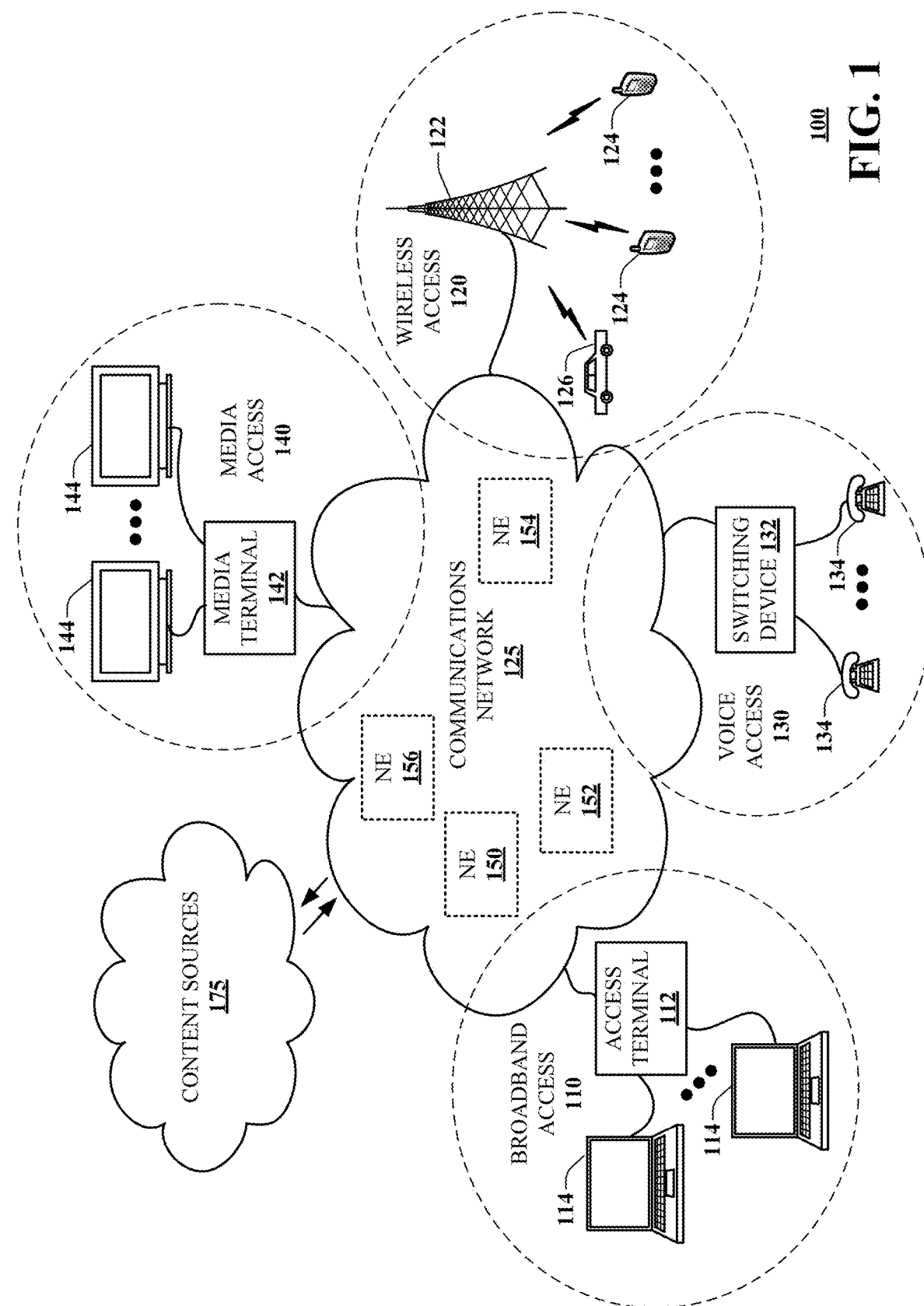
FIG. 1 is a block diagram illustrating an exemplary, non-limiting embodiment of a communications network in accordance with various aspects described herein.

The subject disclosure describes, among other things, illustrative embodiments of a system and method for detecting anomalies from data streams and generating alert summaries. Other embodiments are described in the subject disclosure.

One or more aspects of the subject disclosure include a device having a processing system including a processor; and a memory that stores executable instructions that, when executed by the processing system, facilitate performance of operations of: generating values from a data stream generated by one or more equipment in a communications network; creating a first window of values received before a first point in time and a second window of values received on or after the first point in time; comparing a distribution of values in the first window and values in the second window to compute a distance at the first point in time; repeating the creating and comparing at subsequent points in time after the first point in time, thereby generating a series of distances; computing a score for a first distance in the series of distances; generating an alert responsive to the score exceeding a threshold; and storing the alert in a log of alert.

One or more aspects of the subject disclosure include a non-transitory, machine-readable medium, comprising executable instructions that, when executed by a processing system including a processor, facilitate performance of operations, including: creating a first window of values from a data stream generated by one or more equipment in a communications network, wherein the values are received before a first point in time and a second window of values received on or after the first point in time; comparing a distribution of values in the first window and values in the second window using an Earth Mover's distance algorithm to compute a distance at the first point in time; repeating the creating and comparing at subsequent points in time after the first point in time, thereby generating a series of distances; computing a score for a first distance in the series of distances; generating an alert responsive to the score exceeding a threshold; and storing the alert in a log of alerts.

One or more aspects of the subject disclosure include a method of creating, by a processing system including a processor, a first window of values from a data stream generated by one or more equipment in a communications network, wherein the values are received before a first point in time and a second window of values received on or after the first point in time; comparing, by the processing system, a distribution of values in the first window and values in the second window to compute a distance at the first point in time; repeating, by the processing system, the creating and comparing at subsequent points in time after the first point in time, thereby generating a series of distances; computing, by the processing system, a z-score for a first distance in the series of distances; generating, by the processing system, an alert responsive to the z-score exceeding a threshold; storing, by the processing system, the alert in a log of alerts; selecting, by the processing system, alerts from the log of alerts relevant to user-supplied criteria; providing, by the processing system, descriptions of each of the selected alerts to a Generative AI; and receiving, by the processing system, a summary report of the selected alerts from the Generative AI.

Referring now to FIG. 1, a block diagram is shown illustrating an example, non-limiting embodiment of a system 100 in accordance with various aspects described herein. For example, system 100 can facilitate in whole or in part creating two sliding windows of values from a data stream; computing distances by comparing the distribution of values in the windows at several points in time; computing a z-score for each distance computed; and generating an alert responsive to the z-score exceeding a threshold. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. Telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

A data stream is a sequence of values, e.g., $x_1$, $x_2$, $x_3$, etc., that can be examined to determine whether there are any anomalies or unexpected changes indicating a problem in the underlying monitored system. Each value has a timestamp that indicates the time of the measurement, namely measurement time or valid time. The timestamp is also associated with the time when the value was recorded in the database of the monitoring system, namely a transaction time.

Figure 2A:
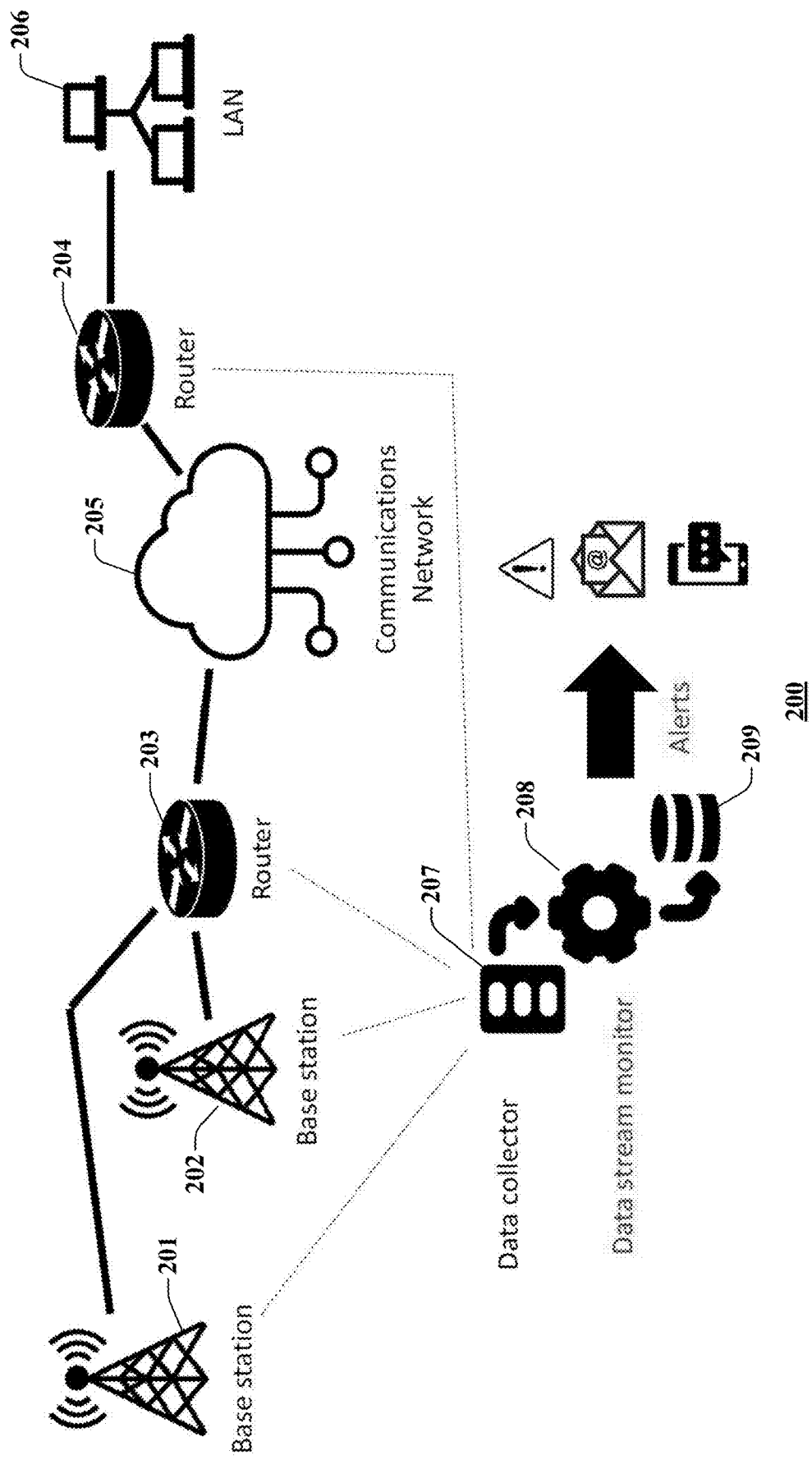
FIG. 2A is a block diagram illustrating an example, non-limiting embodiment of a system for detecting anomalous changes in data streams within the communication network of FIG. 1 in accordance with various aspects described herein.

FIG. 2A is a block diagram illustrating an example, non-limiting embodiment of a system for detecting anomalous changes in data streams within the communication network of FIG. 1 in accordance with various aspects described herein. As shown in FIG. 2A, a data stream originating at a device may traverse many network components including base stations 201, 202, routers 203, 204, a communications network 205 and a local area network 206, before reaching a destination device. System 200 comprises a data collector 207, a data stream monitor 208 and information storage 209. By monitoring a series of measurements collected over time from multiple points in the path of the data stream and generating values therefrom, system 200 can detect anomalous changes in the data stream and generate alerts, as set forth in more detail below.

In an embodiment, system 200 collects mobility data from a cellular network in distinct locations across a continent. System 200 collects parameters about the network, like traffic volume, number of served devices, and others, and analyzes the parameters to compute key performance indicators (KPIs) that indicate the status of the network and the base stations. In an embodiment, data stream monitor 208 may employ modular units to detect the anomalous changes in the data stream and generate alerts. The modular units provide a flexible approach and enable reuse of analysis techniques shown to provide results that can easily be integrated into the system. For example, the system can generate initial values in different forms (stream of values, stream of variance values, stream of skew values, stream of outlier density, stream of absence of values, etc. computed for each point in the stream per the previously seen values). Missing values might prevent detecting a significant change in the variability of the system. Imputing values before analysis with sliding windows would help reduce the effect of the missing values and enhance detection of a change in variance. On the other hand, too much variance may interfere with the detection of a level shift. Smoothing a stream of values before comparing the values by two sliding windows could help identify the level shift more clearly. Smoothing, imputation, and similar methods could be applied by invoking modular units. The goal is smoothing to reduce variability and enhance other issues, imputation to reduce the effect of missing values and enhance other anomalies, and so on.

The detected anomalous changes in the data stream are anomalies associated with real events, i.e., cases where an event in the network affected the data collection and caused an increase in the mean and variance of collected KPIs. Detecting such cases helps with (1) handling the problem, (2) applying prevention steps to avoid repeating the problem, and (3) providing data with higher quality to downstream applications, like outage compensation (where the parameters of a base station are modified to compensate for an outage in another base station), energy saving by smart selection of antenna parameters, network automation, etc. System 200 requires high-quality data for training machine-learning (ML) models for analyzing such anomalies. By detecting missing data or data with high variance, ML experts can select which data to use for training ML models and avoid creating bad models by training models on low-quality data.

Figure 2B:
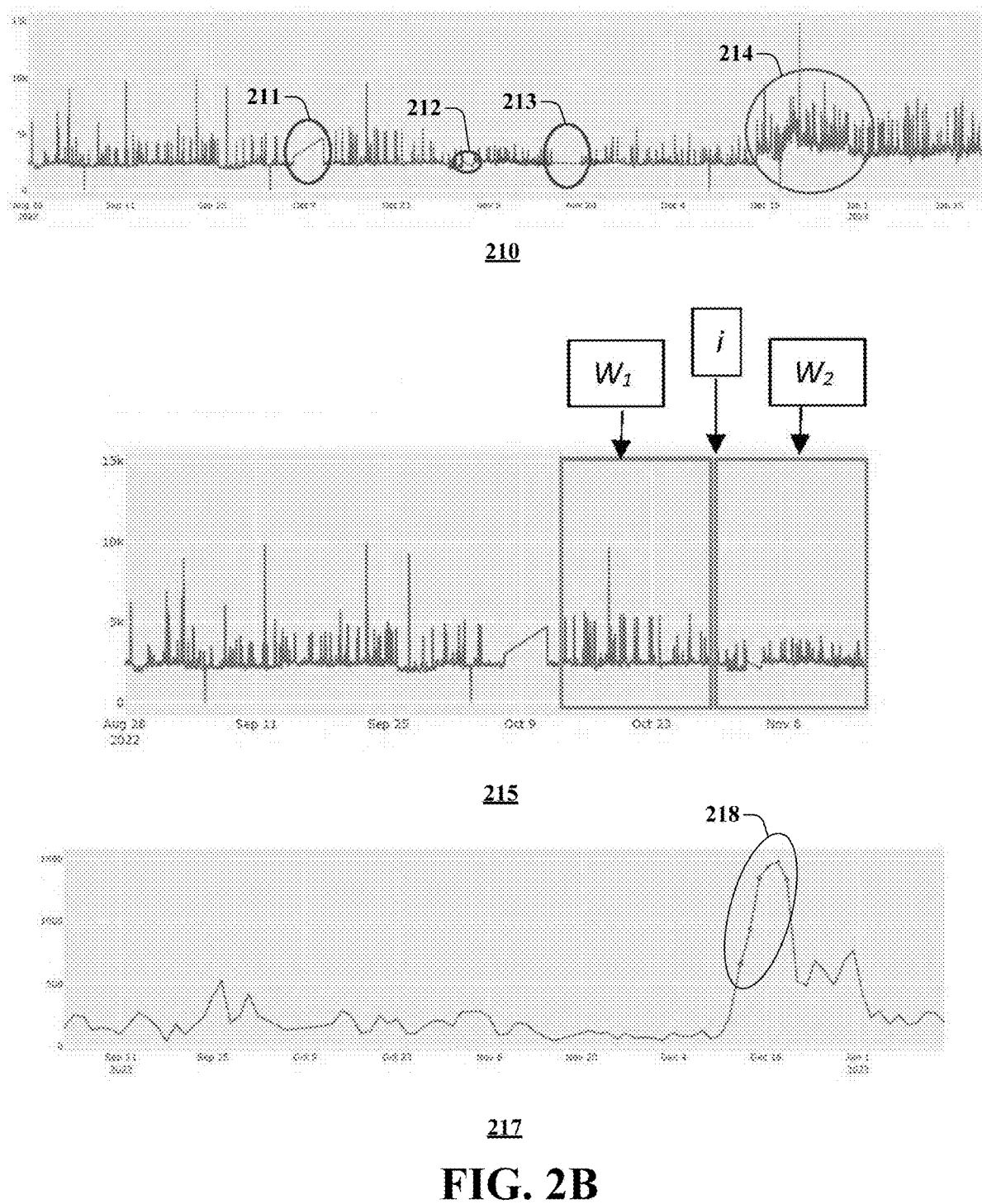
FIG. 2B is a diagram illustrating an example, non-limiting embodiment of graphs of data streams and data analysis performed by a system functioning within the communication network of FIG. 1 in accordance with various aspects described herein.

FIG. 2B is a diagram illustrating an example, non-limiting embodiment of graphs of data streams and data analysis performed by a system functioning within the communication network of FIG. 1 in accordance with various aspects described herein. As shown in FIG. 2B, graph 210 illustrates a data stream, i.e., a series of measurements over time. The system can generate values in different forms, e.g., a stream of values, a stream of variance values, a stream of outlier density, a stream of absence, etc., computed for each point in the stream from the measurements. The system can apply methods, like imputation or smoothing to the stream to enhance some issues and mask others. Then, the system may apply the comparison of the two windows with different distance functions. The graphs show a list cell duration, which is the time it takes to gather records from a random sample of cells during the KPI generation process. When the values are too high, missing or have high variance, such anomalies provide an indication of a problem in the system. Such anomalies may also lead to a data quality issue where the generated KPIs are not reflecting a typical operation of the system.

In the example illustrated by graph 210, the data stream represents network measurements recorded from Aug. 28, 2022, to Jan. 15, 2023. The system must analyze the measurements in the data stream to focus on changes in continuity, mean, variability, and concentration of outliers (but may track other changes as well). A gap in a data stream, i.e., discontinuity, is a time interval during which data values are missing. Gaps can be the result of measured values that are delayed and arrive late or values that are missing altogether. Many applications that use the data stream should be aware of data gaps and missing values, so that these applications can analyze the streaming data properly. Data gaps 211, 212, 213 are marked by red circles in graph 210. The system can easily detect data gaps. When processing the data stream, at each point the system knows the last timestamp of the previous data points. To cope with delayed data, the gap can be computed after waiting for some predefined time. If the observed gap is above a threshold, the system can raise an alert.

A shift or bias in the data stream can lead to a change in the mean, where the average of the measured values changes. Such a shift can indicate a lasting significant increase or decrease in the measured values. For example, when measuring latencies, the data stream may show that there is an increase in the average latency of the monitored system, which may indicate a reduction in the quality of service. Circled area 214 in graph 210 indicates a level shift around December 18, where the values in the data stream after the change are "shifted up" and have values that are higher than the earlier values.

Merely comparing distributions and defining statistical measures is inadequate because such theoretical analysis does not provide a practical solution for discovering a level shift. In an embodiment, the system compares the distribution in two consecutive time windows to detect such a level shift. To compare the distribution change at a given time, at each point i, the system looks at a first sliding window $W_1$ of preceding sequential values $[x_{i-w}, x_{i-w+1} \ldots x_{i-1}]$ and a second sliding window $W_2$ of subsequent sequential values $[x_i, x_{i+1} \ldots x_{i+w-1}]$, as illustrated by graph 215. Distance d is the difference between the distributions of the values in the two windows $W_1$ and $W_2$. Different methods exist for comparing distributions, including Jensen-Shannon Divergence, Kolmogorov-Smirnov test, etc. In an embodiment, the system uses Earth Mover's distance (EMD) algorithm, also known as Wasserstein distance. EMD determines the minimum change needed to apply to the values seen in one distribution to create the other distribution. Intuitively, EMD considers each distribution as an amount of earth (soil) piled over a metric space. The metric space is the minimum cost of turning one pile into the other, i.e., the minimum amount of earth that needs to be moved from one pile to create the other pile. This distance measure takes into account not only how many values are different from one another in the two distributions but also the total size of the differences.

Graph 217 illustrates a result generated by the system while applying EMD on the data stream illustrated in graph 210. Note that the level shift circa December 18 results in a significant increase in the values of EMD, as illustrated by the points in circle 218 on graph 217. The system will detect the anomalous behavior, i.e., the anomalous increase in the EMD graph, by computing a Z-score from the EMD stream. In other words, the system computes a moving average over the EMD distances such that $avg(EMDi)=(d_1+d_2+ \ldots +d_{i-1})/(i-1)$. Similarly, the system computes the variance of these mean values. Then, the system compares the mean to $d_i$, the $i^{th}$ EMD value, and if the difference is three or more standard deviations, the system raises an alert. Note that in this example, three standard deviations is an arbitrary threshold, which can be selected to be lower or higher, depending on whether the application is more sensitive to false negative or false positive cases.

FIG. 2C is a diagram illustrating an example, non-limiting embodiment of graphs of data streams and data analysis performed by a system functioning within the communication network of FIG. 1 in accordance with various aspects described herein. As shown in FIG. 2C, graph 220 illustrates a change in the frequency or density of point anomalies in the data stream. When applying an ordinary anomaly detection method, like Z-score or Hampel Filter to the series, the result is a sequence of point anomalies. Point anomalies may occur periodically, due to minor glitches and short-lasting irregularities. But when there is a concentration of point anomalies or an increase in the frequency and density of point anomalies, this can indicate a major change in the behavior of the monitored system. Graph 220 indicates outliers marked as red dots and circles 221 and 222 indicate concentration of outliers, i.e., where there is a change in the frequency of occurrence. When detecting changes in outlier frequency (outlier distribution), the system compares the outliers in two consecutive moving windows $W_1$ and $W_2$, as in the previous computations. Significantly more anomalies in the second window indicate that there is a change in the frequency of outliers.

Graphs 223 and 227 show a similar method of anomaly detection using ARIMA (autoregressive integrated moving average). In graph 223, the system plots residuals between observed values taken before January 1 to after Mar. 26, 2023, and values predicted by an ARIMA model. Outliers in the residuals are determined using a cumulative z-score, indicated in graph 223 in red. Periods in which the outlier frequency changes are detected by summing the total number of outliers over a moving window. The resulting plot is shown in graph 224. The system detects anomalous changes in the number of outliers using a cumulative z-score, as indicated by the points in circle 225.

The system can detect other types of level shifts in a similar way, by (1) creating two sliding windows and comparing the distribution between the windows using EMD. (2) creating the graph of the distance between the distributions in the two moving windows, and (3) applying an anomaly detection methods like cumulative z-score, ARIMA or a similar method, to detect when the change is an outlier. The system can apply this technique to values such as the volume of the arriving data (how many points per time unit), the absence (how many points are missing per time unit), the delay (the time difference between consecutive points in the stream), etc. The system can make such detection in the stream of values or in other statistical features of the stream, like variance and skew. At each point in the stream, the variance (skew) will be computed for that point, e.g., based on the w preceding values. This yields a sequence of variance (skew) values on which the EMD-based comparison of the two windows can be computed.

FIG. 2D is a diagram illustrating an example, non-limiting embodiment of graphs of data streams and data analysis performed by a system functioning within the communication network of FIG. 1 in accordance with various aspects described herein. One of the limitations of having two consecutive windows $W_1$ and $W_2$, as described above, is that the value of the difference between the distributions in the two windows is known for point $v_i$ only when w values following $v_i$ have already arrived, that is, at the time of point i+w. The system can perform a preliminary evaluation by conducting computations with windows of varied sizes. For example, window $W_1$ remains size w; however, $W_2$ is initially small, having a minimum size of $W_{min}$, but grows as more points arrive. The system computes a final result when $W_2$ contains w points. But before that happens, the system has a preliminary computation of a comparison of the points in windows $W_1$ and $W_2$, while there are less than w points in $W_2$. The preliminary computation can provide an early detection of a level shift, in some cases.

For this preliminary computation, define a function $g(i,t)$ that for each time $t<i+w$, computes a temporary value for point i. The temporary value is a comparison of the distributions in window $W_1$ and the window from point i to point t. The system creates a sequence of values (at different times) for point i, $g(i,t), g(i,t+1), \ldots g(i,t+w-1)$ where in this sequence, at each step the values get closer to the actual value of the comparison function (i.e., presented in graph 217 of FIG. 2B), and finally, $g(i,t+w-1)$ is EMD for the full window. Note that at a given time t, the system generates estimates for different points, so if $j=t-w+1$, then the system generates the values $g(j,t), g(j+1,t) \ldots g(j+w,t)$ for the w points before point t. The first estimates include almost all the information needed for the evaluation of the EMD for the full windows. For the points closer to time t, there is still not enough information, so the estimation may be less accurate. This technique provides early estimation of the distribution change in points, and it can assist with early detection of changes in the data stream. Graphs 226 and 227 illustrate the selection of values used by the system to compute $g(i,t)$ and $g(i,t')$ at times t and t', respectively.

Figure 2E:
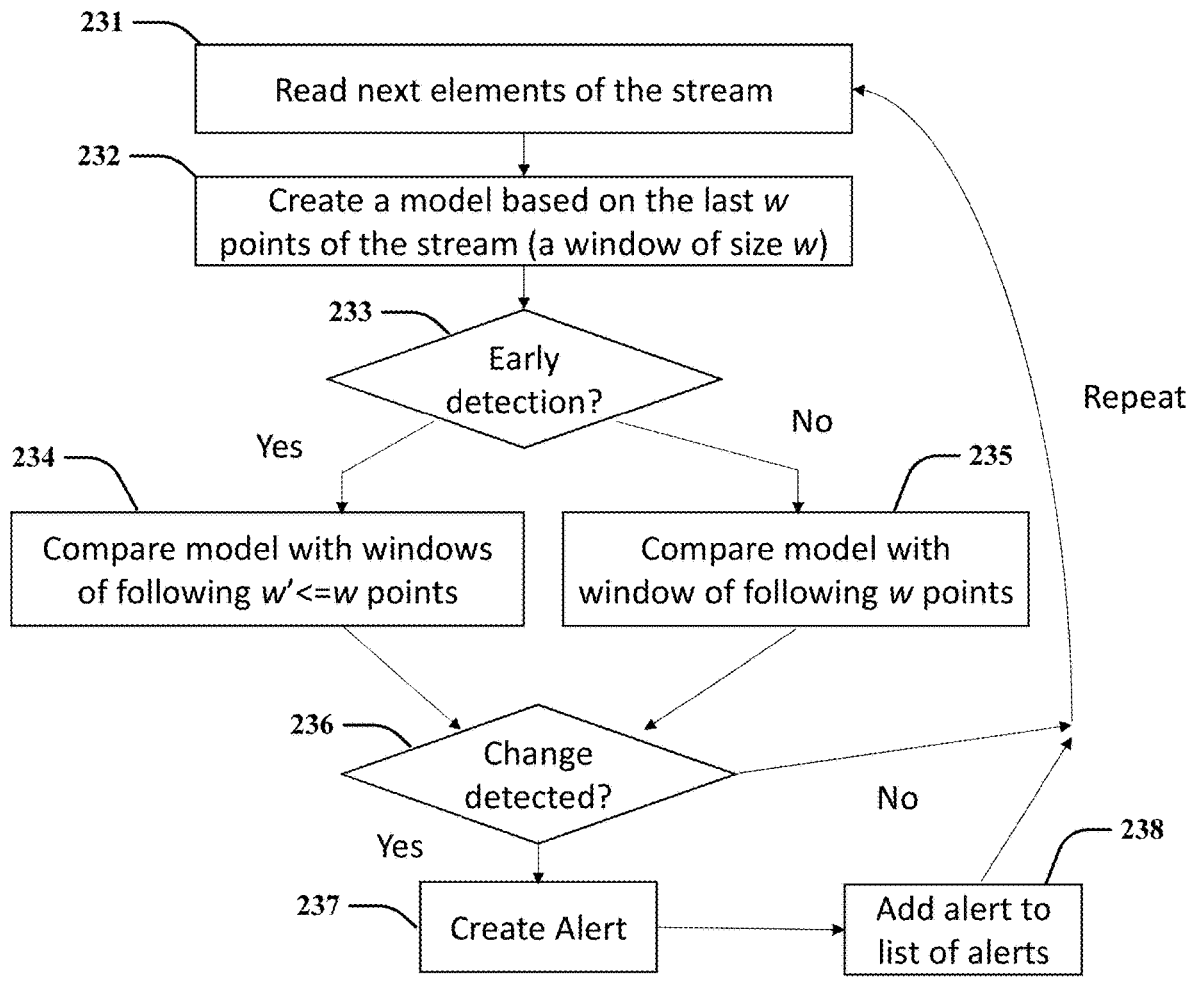
FIG. 2E depicts an illustrative embodiment of a method for generating alerts from a data stream in accordance with various aspects described herein.

FIG. 2E depicts an illustrative embodiment of a method for generating alerts from a data stream in accordance with various aspects described herein. As shown in FIG. 2E, method 230 begins at step 231, where the system receives the next point in a data stream. Then in step 232, the system creates a model of the data stream based on the last $w_1$ points of the data stream, i.e., the system uses a window of size $w_1$. Next in step 233, the system decides whether to perform early detection or not. The system decides whether to perform early detection based on the ability to apply mitigation steps early and the sensitivity to false positive cases. For example, if every time that there is an alert a very costly procedure is applied, then raising alerts too early might lead to false positive cases, i.e., incorrect alerts, and might be costly. However, if there are actions that can only be applied early, then early alerts could help addressing the problem while it is still possible to fix. For instance, alerting a network operator when an anomalous number of missing values appear may lead to early detection of a malfunction in a network component and could help preventing data loss. Waiting too long could lead to loss of data that cannot be recovered. If so, then in step 234 the system compares the model with successive points in a window of size $w'<w_2$, and the method continues at step 236. If the system will not attempt early detection, then in step 235 the system will gather points until the system can compare the model with successive points in a window of size $w_2$. Then in step 236, the system will detect a change. If the system does not detect a change, then the process repeats at step 231. But if the system detects a change, then in step 237, the system creates an alert and in step 238 the system stores the alert in a log. The system will then repeat the process at step 231.

Method 230 will typically produce a sequence of alerts. It is often difficult for operators to react to a stream of alerts, especially when the stream could consist of alerts of distinct types, different severity and at various times. Operators could easily be overwhelmed by alerts, and this could lead to a situation where critical alerts are ignored.

The system can also create textual summaries for the alerts generated, which has the following benefits:
  a short textual description of the alerts may be easier to
    understand than examining graphs, especially when
    there are many graphs, and each graph contains a lot of
    data;

short textual messages might be more appropriate for alerts that are sent as text message or by email; and for visually impaired people, or for people who receive an alert when they cannot read the text (e.g., while driving), the system could apply text-to-speech and read the textual alert for the user.

The system can generate a textual description from change-detection and outlier-detection alerts. In an embodiment, default rules or user specifications, like the time period for which a report should be created (e.g., the last month, between November 22 and December 22, etc.), that indicate preferences and conditions of which alerts should be included in a report, e.g., only sever alerts or all the alerts that are of type "missing data."

Figure 2F:
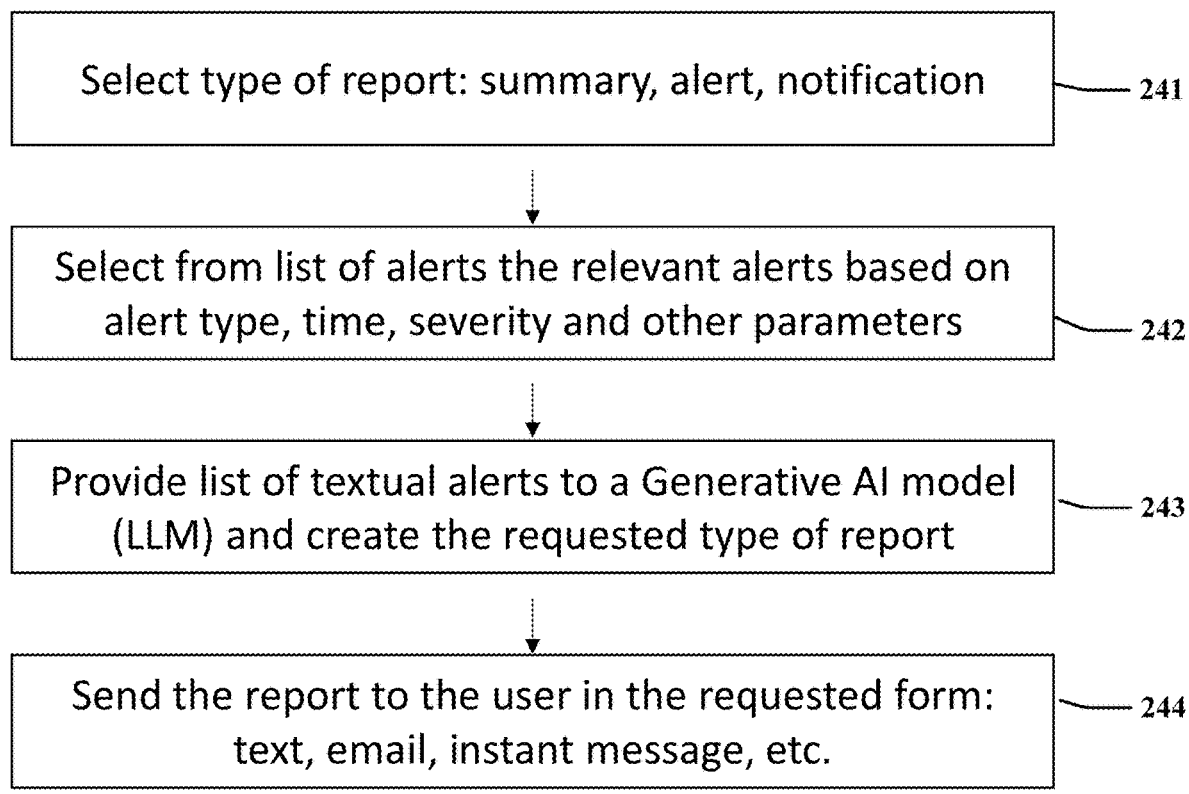
FIG. 2F depicts an illustrative embodiment of a method for summarizing alerts in accordance with various aspects described herein.

FIG. 2F depicts an illustrative embodiment of a method for summarizing alerts in accordance with various aspects described herein. As shown in FIG. 2F, process 240 of creating a report begins at step 241 where a type of report is selected. The report types include summary, alert and notification. Then the system applies change-detection and outlier-detection methods to the data stream to create a list of alerts. The system assigns an occurrence time, type, severity, and duration to each alert, and adds a short textual definition of any other known features.

Next in step 242, the system selects alerts for the time interval of interest. In an embodiment, the system may sort the alerts based on time, severity, or type. Next in step 243, the system collects the short textual descriptions assigned with each alert and provides the descriptions to a Generative AI tool to create a summary of the textual events. Finally in step 244, the system sends the report to the user in a selected format, such as text, email, instant messaging, etc.

In more detail, consider the data stream reproduced in graph 210 of FIG. 2B. The system first detects the anomalies and changes as described above. A sequence of text descriptions generated by the system may be as follows:

August 28 to September 28: a few anomalies. Severity: low. Duration: 31 days.

October 1 to October 15: a gap of missing data. Severity: medium.

Duration: 15 days.

November 1: a gap of missing data. Severity: low.

November 15 to November 20: a gap of missing data. Severity: medium.

Duration: 5 days.

October 15 to December 15: no anomalies. Severity: low. Duration: 31 days.

December 18: a level shift. Severity: high.

December 18 to January 1: level shift of mean. Severity: high. Duration: 14 days.

December 18 to January 15: level shift in variability. Severity: medium.

Duration: 28 days.

When the system feeds these text descriptions into a Generative AI tool, the output produces a textual summary like the following:

The data was mostly normal from August 28 to December 15, except for some anomalies and missing data in September, October and November. On December 18, a level shift occurred, and the variability increased until January 15.

In an embodiment, the system selects the severe events, to focus only on critical events, or by selecting only the data-gap events, the system may create a more focused summary. That is, the relevant events are selected prior to providing the list of events to the Generative AI tool. Also, by sorting the events differently before providing them to the Generative AI tool, the system would produce a different result, e.g., sorting based on severity instead of date or based on the event type. For example, if only the "level shift" events are selected and only the descriptions are provided to the Generative AI too, the following concise summary would result:

There was a significant change in the mean and variability of a data set on December 18, which lasted for 14 days. The change in the mean was more severe than the change in the variability.

The system could also generate longer and more detailed summaries by providing more details or generating short alerts for critical alerts. For instance, consider the following event detected by the system indicating that a critical alert should be sent:

December 18: a level shift. Severity: high. Shift size 2 k.

By asking the language model to generate an alert based on the given details, the system may generate the following alert:

High severity level shift detected on December 18. The data value increased by 2 k units. Please investigate the cause and take appropriate action.

In some cases, events could be actionable, where the system could infer the type of action that the user needs to take, e.g., if a security attack is detected, the system might ask the user to shut down the system. In the case where it seems that the system does not respond, the user may need to restart the server. In these cases, the detected change should also include an "action" clause and the generated text will include the recommended action. The action could be assigned to events based on predefined rules or could be based on an AI classifier that is trained to classify each detected change or anomaly and assign a recommended action to it, if needed.

In an embodiment, the system trains an AI model to estimate the severity of each alert and its urgency, e.g., to decide whether to wait with reporting, send an alert to the email address of the responsible user or send the alert as a text message, to the user's phone. The approach that is described here can be easily generalized to several data streams that monitor several aspects of the system. For example, the system may be applied to a cluster of 10 machines and monitor the CPU utilization. GPU utilization, memory usage, disk usage, and network throughput of the machines. The monitoring will produce 50 streams and each event should include the name of the machine and the type of measure. For instance, consider requesting a summary of the events listed below.

Server 3, 7:00 am to 7:30 am, CPU utilization, a few anomalies, severity: low, duration: 30 minutes.

Server 2, 9:03 am to 9:07 am, disk utilization, a gap of missing data, severity: medium, duration: 4 minutes.

Server 2, 10:35 am to 10:50 am, disk utilization, a gap of missing data, severity: medium, duration: 15 minutes.

Server 3, 11:02 am to 11:30 am, network bandwidth, a gap of missing data, severity: medium, duration: 28 minutes.

Server 8, 1:05 pm, CPU utilization, utilization drops to zero, severity: alert, action: check server crash, restart if necessary.

Server 5, 1:05 μm to 2:40 pm, disk utilization, variability level shift, severity: medium, duration: 35 minutes.

Server 5, 1:05 μm to 2:30 pm, network throughput, a mean level shift of 100 Kbps, severity: high, duration: 25 minutes.

Server 5, 1:05 μm to 2:30 pm, CPU utilization, a mean level shift of 30%, severity: high, duration: 25 minutes.
This may lead to an alert at 1:05:
Server 8 has zero CPU utilization at 1:05 pm. This may indicate a server crash. Please check the server status and restart it if necessary.

The system would generate a summary of the day as follows:

There were several events of low to high severity affecting different servers throughout the day. The most critical event was a possible server crash on Server 8 at 1:05 pm that required immediate action. Server 5 also experienced multiple issues with disk utilization, network throughput and CPU utilization from 1:05 μm to 2:40 pm that had high severity and long duration. Server 2 and Server 3 had some gaps of missing data and anomalies in disk utilization, network bandwidth and CPU utilization that had medium to low severity and short to medium duration.

The ability to quickly read alerts and summaries could save considerable time for system operators and could lead to better reactions to events. Overall, this could improve the operation and maintenance of complex systems and network infrastructures.

While for purposes of simplicity of explanation, the respective processes are shown and described as a series of blocks in FIGS. 2E and 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As advancing networking technology makes a cellular network more complex, such innovation increases the amount of data created by network elements and makes detection and prevention of events more critical. Hence, there is a growing need for methods that detect events and present alerts, for better deployment and management of such networks. The methods presented above improve network management and planning as the technology progresses. Detecting problems is critical for network management so that such problems can be mitigated as early as possible. The proposed methods prevent a flood of alerts by summarizing critical events succinctly. The system creates simple textual alerts that can be easily sent to operators by email or text, without overwhelming operators-thereby increasing their attentiveness toward alerts. This helps operators react faster when managing network events. Furthermore, the proposed methods detect data quality issues in the monitored data streams. The method can be used to guarantee that data used in analysis or for training ML models has a high quality. Since data about the network is often used for network planning, the proposed methods can improve such planning of networks by improving the data quality used in such processes.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part creating two sliding windows of values from a data stream; computing distances by comparing the distribution of values in the windows at several points in time; computing a z-score for each distance computed; and generating an alert responsive to the z-score exceeding a threshold.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud computer services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
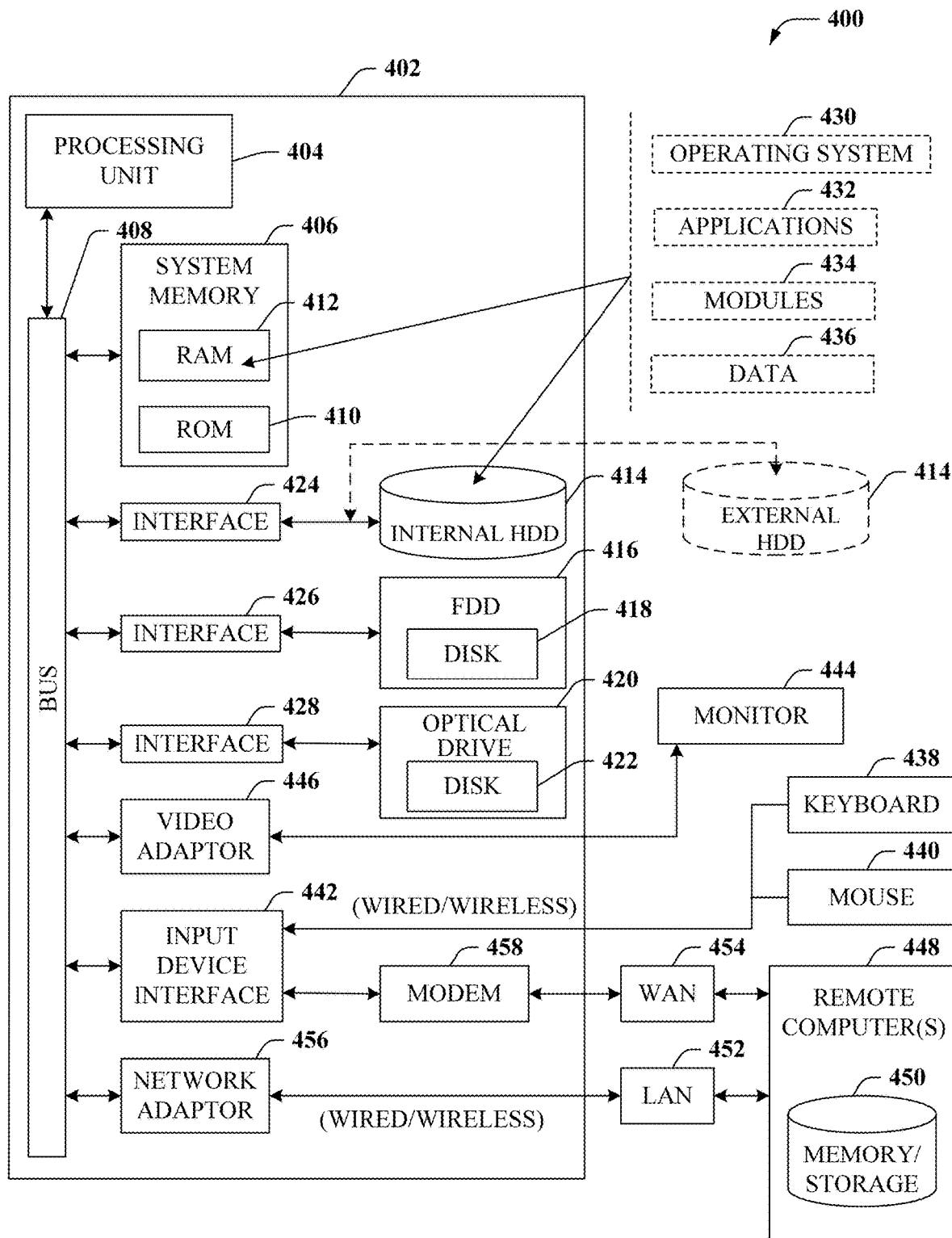
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part creating two sliding windows of values from a data stream; computing distances by comparing the distribution of values in the windows at several points in time; computing a z-score for each distance computed; and generating an alert responsive to the z-score exceeding a threshold.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. System memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen and the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. Modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
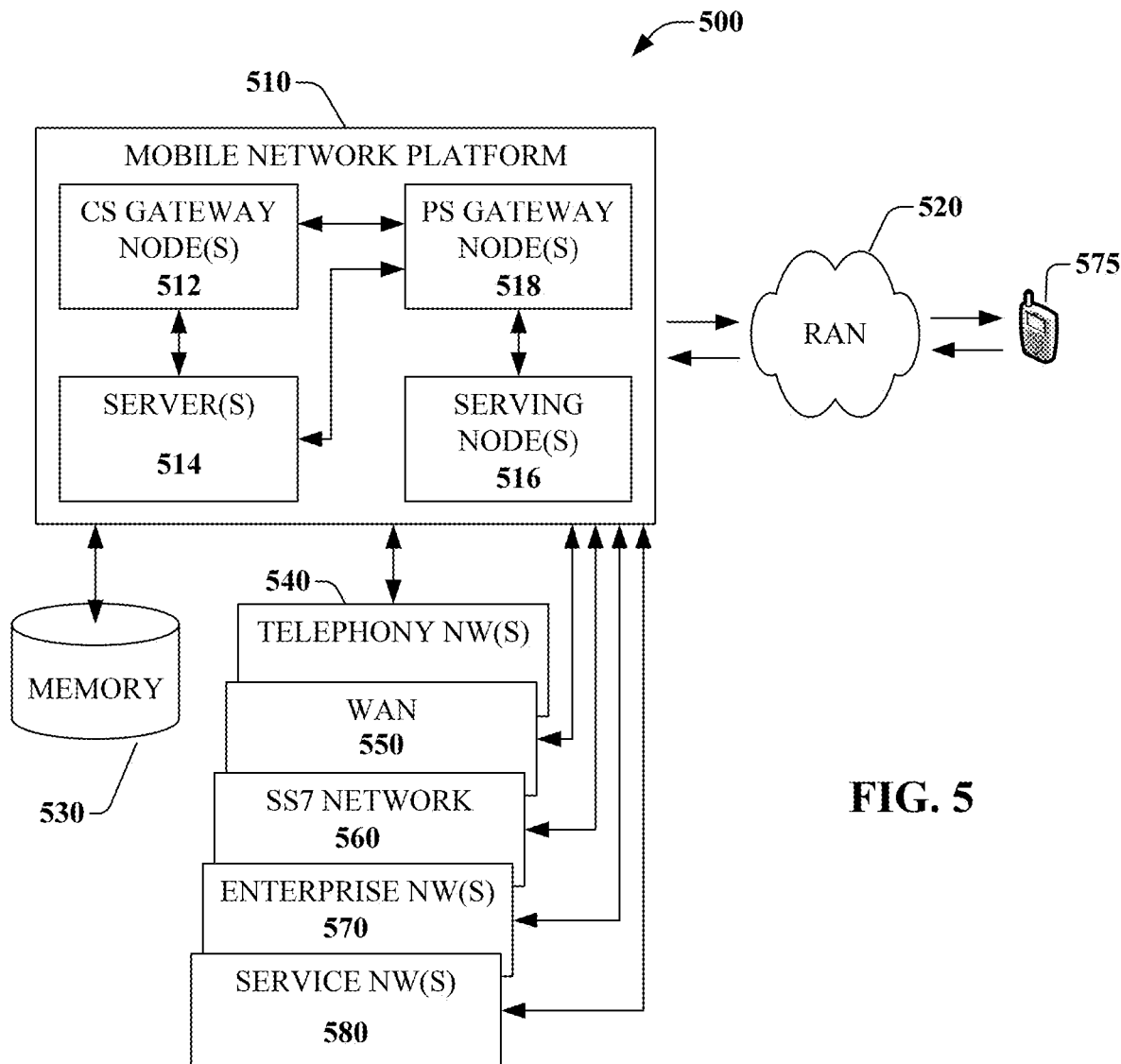
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part creating two sliding windows of values from a data stream; computing distances by comparing the distribution of values in the windows at several points in time; computing a z-score for each distance computed; and generating an alert responsive to the z-score exceeding a threshold. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
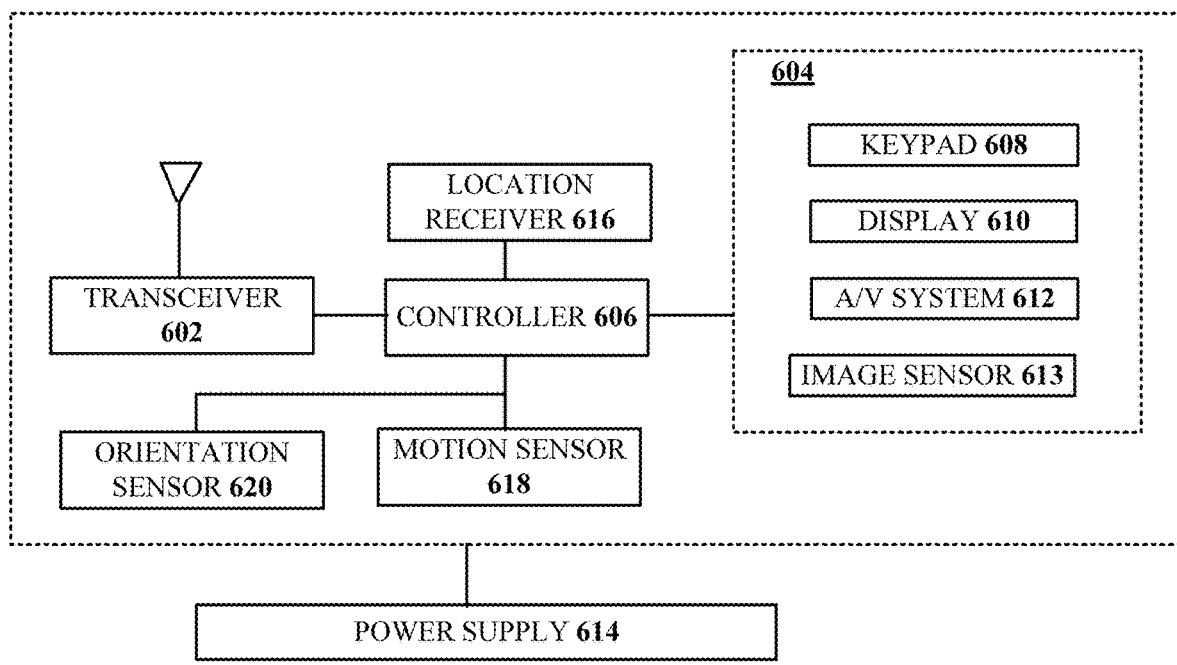
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part creating two sliding windows of values from a data stream; computing distances by comparing the distribution of values in the windows at several points in time; computing a z-score for each distance computed; and generating an alert responsive to the z-score exceeding a threshold.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS. TDMA/EDGE, EV/DO, WiMAX, SDR. LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. Display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals from an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
generating values for a plurality of metrics from a data stream generated by one or more equipment in a communications network;
creating a first window of values for the plurality of metrics received before a first point in time and a second window of values for the plurality of metrics received on or after the first point in time;
comparing a distribution of values for the plurality of metrics in the first window and values for the plurality of metrics in the second window to compute a distance for each of the plurality of metrics at the first point in time;
repeating the creating and comparing at subsequent points in time after the first point in time, thereby generating a series of distances for each of the plurality of metrics;
computing a plurality of scores for the series of distances for the plurality of metrics;
determining if a first score of the plurality of scores for the series of distances for a first metric of the plurality of metrics exceeds a first threshold associated with the first metric;
identifying a type and a severity of an anomaly associated with the first metric of the plurality of metrics based on the first score exceeding the first threshold;
converting the type and the severity of the anomaly associated with the first metric into a textual description to generate an alert; and
storing the alert in a log of alerts.

2. The device of claim 1, wherein the device using an Earth Mover's distance algorithm to compare the distribution of values in the first window and the second window, and wherein the first window is a sliding window that consists of a first number of sequential values just before each point in time.

3. The device of claim 2, wherein the second window is a sliding window that consists of a second number of sequential values starting from each point in time.

4. The device of claim 3, wherein the second number is smaller than the first number, thereby generating early alerts.

5. The device of claim 4, wherein the second number increases responsive to receiving additional values from the data stream.

6. The device of claim 1, wherein the values generated are measurements, variance, skew, outlier density, absence, or a combination thereof.

7. The device of claim 1, wherein the operations further comprise:
selecting alerts from the log of alerts relevant to user-supplied criteria;
providing descriptions of each of the selected alerts to a Generative AI; and
receiving a summary report of the selected alerts from the Generative AI.

8. The device of claim 7, wherein the user-supplied criteria comprise alert type, time of alert, severity of alert or a combination thereof.

9. The device of claim 1, wherein the score is a z-score and the threshold is three or more standard deviations.

10. The device of claim 1, wherein the processing system comprises a plurality of processors operating in a distributed computing environment.

11. A non-transitory, machine-readable medium, comprising executable instructions that, when executed by a processing system including a processor, facilitate performance of operations, the operations comprising:
creating a first window of values for a plurality of metrics from a data stream generated by one or more equipment in a communications network, wherein the values for the plurality of metrics are received before a first point in time and a second window of values for the plurality of metrics received on or after the first point in time;
comparing a distribution of values for the plurality of metrics in the first window and values for the plurality of metrics in the second window using an Earth Mover's distance algorithm to compute a distance at the first point in time;
repeating the creating and comparing at subsequent points in time after the first point in time, thereby generating a series of distances for each of the plurality of metrics;
computing a plurality of scores for the series of distances for the plurality of metrics;
determining if a first score of the plurality of scores for the series of distances for a first metric of the plurality of metrics exceeds a first threshold associated with the first metric;
identifying a type and a severity of an anomaly associated with the first metric of the plurality of metrics based on the first score exceeding the first threshold;
converting the type and the severity of the anomaly associated with the first metric into a textual description to generate an alert; and
storing the alert in a log of alerts.

12. The non-transitory, machine-readable medium of claim 11, wherein the first window is a sliding window that consists of a first number of sequential values just before each point in time, and wherein the score is computed by a z-score, a Hampel filter, ARIMA, or a combination thereof.

13. The non-transitory, machine-readable medium of claim 12, wherein the second window is a sliding window that consists of a second number of sequential values starting from each point in time.

14. The non-transitory, machine-readable medium of claim 13, wherein the second number is smaller than the first number, thereby generating early alerts.

15. The non-transitory, machine-readable medium of claim 14, wherein the second number increases responsive to receiving additional values from the data stream.

16. The non-transitory, machine-readable medium of claim 11, wherein the first distance corresponds to a last point in the series of distances.

17. The non-transitory, machine-readable medium of claim 11, wherein the operations further comprise:
- selecting alerts from the log of alerts relevant to user-supplied criteria;
- providing descriptions of each of the selected alerts to a Generative AI; and
- receiving a summary report of the selected alerts from the Generative AI.

18. The non-transitory, machine-readable medium of claim 17, wherein the user-supplied criteria comprise alert type, time of alert, severity of alert or a combination thereof, and wherein the threshold is three or more standard deviations.

19. The non-transitory, machine-readable medium of claim 11, wherein the processing system comprises a plurality of processors operating in a distributed computing environment.

20. A method, comprising:
- creating, by a processing system including a processor, a first window of values for a plurality of metrics from a data stream generated by one or more equipment in a communications network, wherein the values for the plurality of metrics are received before a first point in time and a second window of values for the plurality of metrics received on or after the first point in time;
- comparing, by the processing system, a distribution of values for the plurality of metrics in the first window and values for the plurality of metrics in the second window to compute a distance for the plurality of metrics at the first point in time;
- repeating, by the processing system, the creating and comparing at subsequent points in time after the first point in time, thereby generating a series of distances for the plurality of metrics;
- computing, by the processing system, a plurality of scores for the series of distances for the plurality of metrics;
- determining, by the processing system, if a first score of the plurality of scores for the series of distances for a first metric of the plurality of metrics exceeds a first threshold associated with the first metric;
- identifying, by the processing system, a type and a severity of an anomaly associated with the first metric of the plurality of metrics based on the first score exceeding the first threshold;
- converting, by the processing system, the type and the severity of the anomaly associated with the first metric into a textual description to generate an alert;
- storing, by the processing system, the alert in a log of alerts;
- selecting, by the processing system, alerts from the log of alerts relevant to user-supplied criteria;
- providing, by the processing system, descriptions of each of the selected alerts to a Generative AI; and
- receiving, by the processing system, a summary report of the selected alerts from the Generative AI.

* * * * *